US011048506B2

(12) United States Patent
Ramani et al.

(10) Patent No.: US 11,048,506 B2
(45) Date of Patent: Jun. 29, 2021

(54) TRACKING STORES AND LOADS BY BYPASSING LOAD STORE UNITS

(71) Applicant: Advanced Micro Devices, Inc., Santa Clara, CA (US)

(72) Inventors: Krishnan V. Ramani, Santa Clara, CA (US); Kai Troester, Boxborough, MA (US); Frank C. Galloway, Austin, TX (US); David N. Suggs, Austin, TX (US); Michael D. Achenbach, Austin, TX (US); Betty Ann McDaniel, Austin, TX (US); Marius Evers, Santa Clara, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 182 days.

(21) Appl. No.: 16/450,897

(22) Filed: Jun. 24, 2019

(65) Prior Publication Data
US 2019/0310845 A1    Oct. 10, 2019

Related U.S. Application Data

(63) Continuation-in-part of application No. 15/380,778, filed on Dec. 15, 2016, now Pat. No. 10,331,357.
(60) Provisional application No. 62/377,301, filed on Aug. 19, 2016.

(51) Int. Cl.
*G06F 9/28* (2006.01)
*G06F 9/30* (2018.01)
*G06F 9/38* (2018.01)

(52) U.S. Cl.
CPC ............ *G06F 9/28* (2013.01); *G06F 9/30043* (2013.01); *G06F 9/3838* (2013.01)

(58) Field of Classification Search
CPC ...... G06F 9/28; G06F 9/30043; G06F 9/3838; G06F 9/3834
See application file for complete search history.

(56) References Cited

U.S. PATENT DOCUMENTS

| 7,937,569 B1 | 5/2011 | Sander et al. |
| 9,164,900 B1 | 10/2015 | Schuttenberg |
| 9,250,915 B2 * | 2/2016 | Jacobi ................. G06F 9/30043 |

(Continued)

FOREIGN PATENT DOCUMENTS

| EP | 1244961 A1 | 10/2002 |
| WO | 0150252 A1 | 7/2001 |

OTHER PUBLICATIONS

Burtscher, Martin, and Benjamin G. Zorn. "Prediction outcome history-based confidence estimation for load value prediction." Journal of Instruction-Level Parallelism 1 (1999). (Year: 1999).*

*Primary Examiner* — Francisco A Grullon
(74) *Attorney, Agent, or Firm* — Volpe Koenig

(57) ABSTRACT

A system and method for tracking stores and loads to reduce load latency when forming the same memory address by bypassing a load store unit within an execution unit is disclosed. Store-load pairs which have a strong history of store-to-load forwarding are identified. Once identified, the load is memory renamed to the register stored by the store. The memory dependency predictor may also be used to detect loads that are dependent on a store but cannot be renamed. In such a configuration, the dependence is signaled to the load store unit and the load store unit uses the information to issue the load after the identified store has its physical address.

21 Claims, 14 Drawing Sheets

(56) References Cited

U.S. PATENT DOCUMENTS

| | | |
|---|---|---|
| 2003/0056089 A1 | 3/2003 | Senter et al. |
| 2005/0149702 A1 | 7/2005 | Hily et al. |
| 2006/0107021 A1 | 5/2006 | Barrick et al. |
| 2009/0240919 A1 | 9/2009 | Alexander et al. |
| 2013/0298127 A1* | 11/2013 | Meier ................... G06F 9/3842 718/100 |
| 2014/0337581 A1 | 11/2014 | Meier |
| 2014/0380023 A1 | 12/2014 | Smaus et al. |
| 2015/0309792 A1* | 10/2015 | Meier ................. G06F 9/30043 712/225 |

* cited by examiner

TRACKING STORES AND LOADS BY BYPASSING LOAD STORE UNITS

CROSS REFERENCE TO RELATED APPLICATION

This application claims the benefit of U.S. patent application Ser. No. 15/380,778 filed Dec. 15, 2016, which application claims the benefit of U.S. Provisional Application No. 62/377,301 filed Aug. 19, 2016, both of which are incorporated by reference as if fully set forth herein.

BACKGROUND

Present computer systems provide loads and stores for memory access using load queues and store queues. Generally, these systems operate using store-to-load forwarding. However, store-to-load forwarding fails to provide the lowest latency solution for situations where the loads and stores are directed to the same address.

BRIEF DESCRIPTION OF THE DRAWINGS

A more detailed understanding can be had from the following description, given by way of example in conjunction with the accompanying drawings wherein.

DETAILED DESCRIPTION

Figure 1:
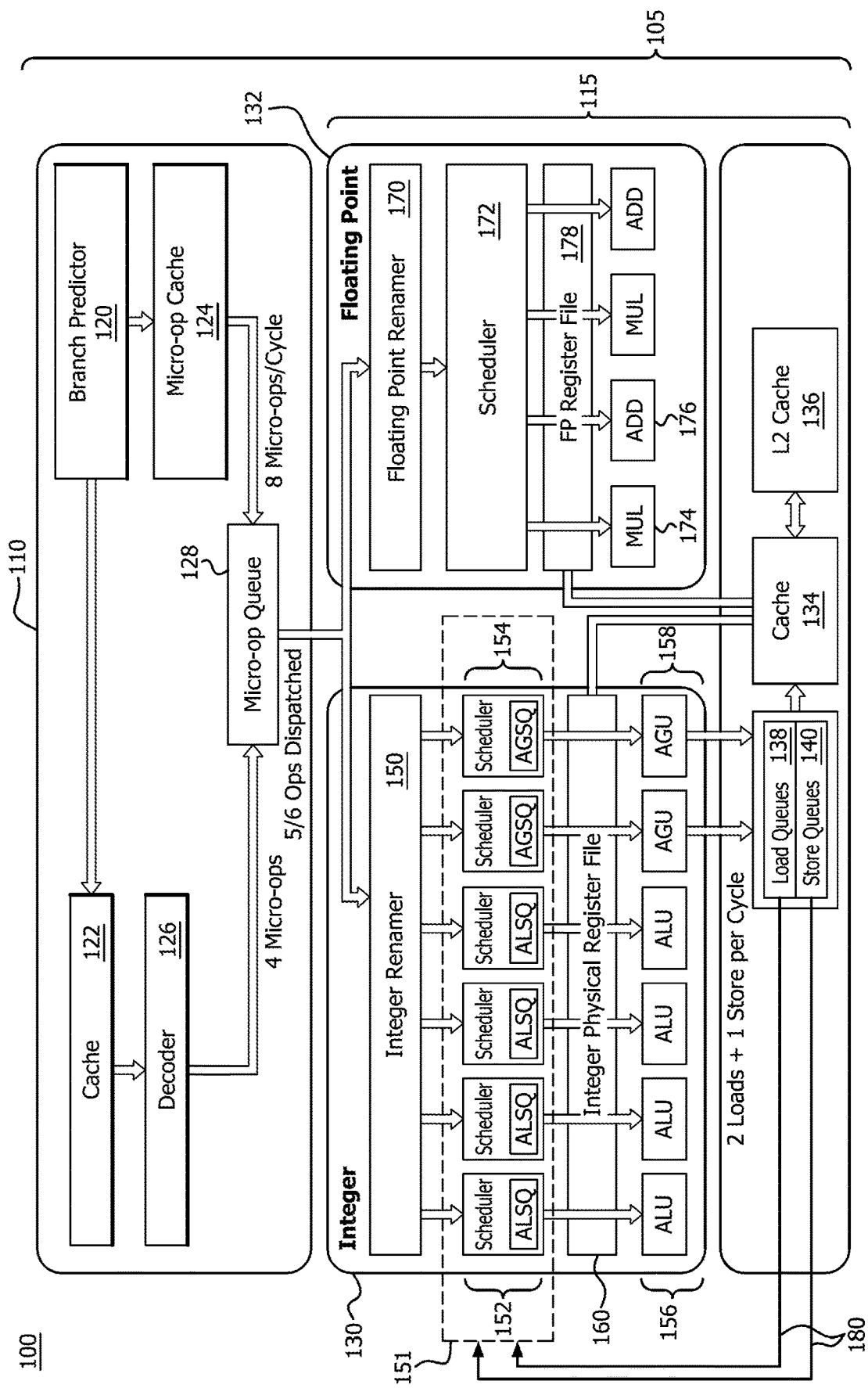
FIG. 1 illustrates a core processing unit of a processor in accordance with certain implementations.

Memory renaming is a way of tracking stores and loads to the same address and bypassing a load store unit when a load follows an associated store. This scenario can happen frequently. As an example, memory renaming is needed when a program stores data via a store queue, performs other processing, then loads the same data via a load queue. This load follows an associated store. Programs often seek to load data that has recently been stored.

A system and method for tracking stores and loads by bypassing a load store unit is disclosed. The system and method include storing data in one or more memory dependent architectural register numbers (MdArns). The one or more MdArns are allocated to an in-memory file cache (MEMFILE). The allocated one or more MdArns are written to a map file, wherein the map file contains a MdArn map to enable subsequent access to an entry in the MEMFILE. Upon receipt of a load request, a base, an index, a displacement and a match/hit signal are checked via the map file to identify an entry in the MEMFILE and an associated store. On a hit, the entry responsive to the load request is provided from the one or more MdArns.

A system and method for identifying load and store instruction information which have a strong history of store-to-load forwarding based on a memory dependency predictor (MDP) is also disclosed. Once identified, the load may be memory renamed to the register stored by the store. The memory dependency predictor may also be used to detect loads that are dependent on a store but cannot be renamed. This information may be used by the processor in any number of ways. In such a configuration, the dependence may be signaled to the load store unit and the load store unit may use the information to issue the load after the identified store has its physical address. Also, the processor may use the dependency between the store and load such that the load is forced to get issued after the store has issued.

A system and method for tracking stack access instructions is also disclosed. In the tracking, a processor employs a prediction table at the front end of the instruction pipeline. The prediction table store address register and offset information for store instructions and stack offset information for stack access instructions. The stack offset information for a corresponding instruction indicates the entry of the stack accessed by the instruction stack relative to a base entry. The processor uses pattern matching to identify predicted dependencies between load/store instructions and predicted dependencies between stack access instructions. A scheduler unit of the instruction pipeline uses the predicted dependencies for stack access dependencies to perform store-to-load forwarding or other operations that increase efficiency and reduce power consumption at the processing system. The scheduler unit may also perform store-to-load forwarding or other operations that increase efficiency and reduce power consumption at the processing system for other forms of memory dependency predictions.

FIG. 1 is a high level step and flow diagram of a core processing unit 105 of a processor 100 in accordance with certain implementations. The core processing unit 105 includes, but is not limited to, a decoder unit 110 which provides micro operations (micro-ops) to a scheduler and/or execution unit 115. The decoder unit 110 includes, but is not limited to, a branch predictor 120 connected to a cache 122 and a micro-op cache 124. The cache 122 is further connected to a decoder 126. The decoder 126 and the micro-op cache 124 are connected to a micro-op queue 128.

The scheduler and/or execution unit 115 includes, but is not limited to, an integer scheduler and/or execution unit 130 and a floating point scheduler and/or execution unit 132, both of which are connected to a cache 134. The cache 134 is further connected to an L2 cache 136, load queues 138, and store queues 140. Load queues 138, store queues 140, and cache 134 are collectively referred to as load store (LS) unit 139.

The integer scheduler and/or execution unit 130 includes, but is not limited to, an integer renamer 150 which is connected to a scheduler 151, which includes arithmetic logic unit (ALU) schedulers (ALSQs) 152 and address generation unit (AGUs) schedulers (AGSQs) 154. The scheduler 151, and in particular the ALSQs 152 and AGSQs 154, are further connected to ALUs 156 and AGUs 158, respectively. The integer scheduler and/or execution unit 130 also includes an integer physical register file 160.

The floating point scheduler and/or execution unit 132 includes, but is not limited to, a floating point renamer 170 which is connected to a scheduler 172. The scheduler 172 is further connected to multipliers 174 and adders 176. The floating point scheduler and/or execution unit 132 also includes a floating point physical register file 178.

A pipelined processor requires a steady stream of instructions to be fed into the pipeline. The branch predictor 120 predicts which set of instructions should be fetched and executed in the pipelined processor. These instructions are fetched and stored in cache 122, and when read from cache 122 are decoded into operations by the decoder 126. A micro-op cache 124 caches the micro-ops as the decoder 126 generates them. The micro-op queue 128 stores and queues up the micro-ops from the decoder 126 and micro-op cache 124 for dispatching the micro-ops for execution.

In conventional pipeline processing, a micro-op queue dispatches certain operations, such as load or store operations, directly to a load queue and/or a store queue that holds the payloads, such as control information decoded from the operation, and memory addresses associated with the micro-ops. For purposes of illustration, the store queue may accept a plurality of operations from the micro-op queue and write the payload into the store queue at dispatch time. At address generation time, the store queue then receives a queue index from a scheduler to specify which store entry is being processed. The scheduler reads out the dispatch payload, and sends it to segmentation logic for segmentation checks, and to a load queue for a possible pick on the micro-op pipeline. That is, conventional pipeline processing is a two pass write process with respect to the store and load queues; once at dispatch for the payload and again at address generation to generate the address in memory.

In accordance with an implementation, the micro-ops are dispatched to the integer scheduler and/or execution unit 130 and the floating point scheduler and/or execution unit 132 only, instead of directly writing to the load queues 138 and store queues 140 as per the conventional pipeline processing. In particular, the micro-ops are directed to: (1) the scheduler 151 via the integer renamer 150; and (2) the scheduler 172 via the floating point renamer 170. The scheduler 151 holds all of the dispatch payloads for the micro-ops (e.g., the dispatch payloads for the store micro-ops) in the AGSQ 154. That is, the AGSQ 154 holds the micro-ops (e.g., the load and store micro-ops), until a queue entry in the appropriate load queues 138 and/or store queues 140 is available. Once a queue entry is available and the sources for the physical register file 160 are ready, the AGSQ 154 generates the address, reads the dispatch payload and sends the dispatch payload to the load queues 138 and/or store queues 140.

In order to maintain age-ordered operation or in-order queues, every store micro-op is associated with a particular queue entry or queue identifier. In particular, the scheduler 151 needs to know when the AGSQ 154 can perform address generation and when the scheduler 151 can send the stored data (i.e., the dispatch payload) to the store queue 140. Accordingly, a particular queue is communicated by the store queue 140 to the AGSQ 154 when the particular queue is available. While this communication chain is not specifically shown in FIG. 1, this communication is provided as a general matter.

The load queues 138 and store queues 140 send the scheduler 151 (AGSQ 154 and ALSQ 152) a commit-deallocation signal so that the scheduler 151 (AGSQ 154 and ALSQ 152) can update its oldest store micro-op store queue index to enable address generation or to send store data for younger store micro-ops as those older store micro-ops deallocate and free up their respective store queue entries. This can be implemented, for example, by adding an output (not shown) from the load queues 138 and store queues 140 to an input at the scheduler 151 (AGSQ 154 and ALSQ 152).

By holding all dispatch information in the AGSQ 154 and delaying store queue allocation until address generation time (e.g., storing data for store micro-ops whose store queue entry is still in use by the previous store micro-op), more store micro-ops can be dispatched than the store queue 140 size. By eliminating the source of dispatch stalls, further micro-ops can be introduced in the window and allowed to start their work. Any store micro-ops will not be able to get started until the previous store in their store queue entry deallocates, but other micro-ops can proceed. This allows for loads that may be cache misses to dispatch and/or perform address generation in order to start the cache miss.

Support for handling a greater number of stores in the window than there are store queue entries necessitates a way to compare the age of micro-ops. The way to compare the age of the micro-ops is provided by using the store queue entry number associated with the micro-op as well as "wrap" bits that accompany the store queue entry number. The wrap bits determine which "epoch" of the store queue entry the associated store micro-ops will use. A single wrap bit provides a way to track two different "wraps" or "epochs" of the store queue, which enables dispatching the full store queue. When more store micro-ops are allowed to dispatch than store queue entries, there can be micro-ops in the window with the same store queue entry, but from multiple different "wraps" or "epochs" of the store queue. One additional wrap bit, for a total of two wrap bits, provides a way to track four different "wraps" or "epochs" of the store queue, which enables dispatching up to three times the store queue depth.

In an illustrative example, if the implemented architecture has a store queue depth of 44 and there are two 14-entry AGSQs (for up to 28 additional micro-op stores at address generation), then there are a total of 72 stores that are able to be dispatched in the window. Accordingly, the processor will not dispatch more than twice the store queue depth. Two wrap bits are sufficient to track and compare the age of all 72 stores in the machine, and no dispatch stall is needed. The wrap bits are computed at dispatch and are held in the AGSQ payload. If the AGSQ scheduler depth allows dispatch of stores more than three times the store queue depth, additional wrap bits could be added to enable an arbitrary number of stores to dispatch.

The load micro-ops are not necessarily age-ordered and can use other techniques known to those skilled in the art to control execution order of the instructions. In an implementation, the load micro-ops can operate similarly to the store micro-ops.

From an architecture perspective, the implementations described herein solve the issues outlined above. First, the number of dispatch payload write ports can be reduced in the store queue. For example, the number of dispatch payload write ports can be reduced from four (four stores per cycle at dispatch) to two (two store address generations per cycle). Second, difficult timing paths are eliminated. For example, the timing path that involved sending the queue index to the store queue, reading out the payload and then sending the payload to the segmentation logic and load queue is eliminated.

Once address generation is performed by the AGSQs 154 and the data/dispatch payloads are stored in the load queues 138 and store queues 140 as needed, the core processing unit 105 executes the micro-ops. The load queues 138 and store queues 140 return data for the load micro-ops and perform writes for store micro-ops, respectively. For other types of operations the scheduler 151 and the scheduler 172 issue micro-ops to the integer scheduler and/or execution unit 130 and floating-point scheduler and/or execution unit 132 as their respective sources become ready.

As will be discussed in greater detail herein below decoder 126, physical register file 160 and LS unit 139 are communicatively coupled.

Figure 2:
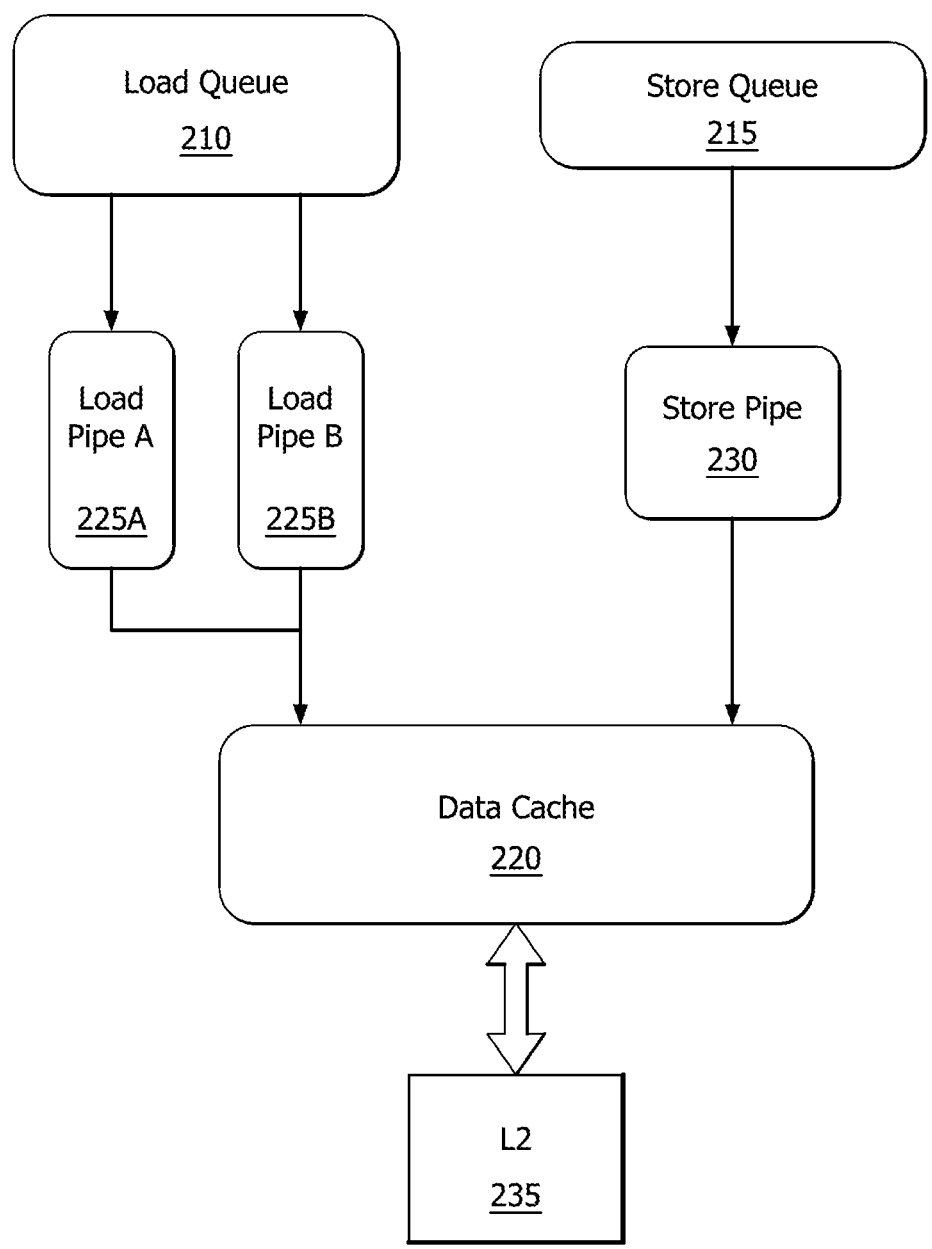
FIG. 2 illustrates a load store (LS) unit for handling data access within the core processing unit of FIG. 1.

FIG. 2 illustrates load store (LS) unit 139 for handling data access within the processor 100. LS unit 139 includes a load queue 210 and a store queue 215, each operatively coupled to a data cache 220. The LS unit 139 includes pipelines, collectively 225 and 230, that are independent. In an implementation, the LS unit 139 includes three pipelines, collectively 225 and 230, enabling execution of two load memory operations 225A, 225B and one store memory operation 230 per cycle.

Load queue 210 of LS unit 139 includes a plurality of entries. In an implementation, load queue 210 includes 44 entries. Load queue 210 receives load operations at dispatch and loads leave load queue 210 when the load has completed and delivered data to the integer scheduler and/or execution unit 130 or the floating point scheduler and/or execution unit 132.

Store queue 215 includes a plurality of entries. In an implementation, store queue 215 includes 44 entries. Although this example is equal to the number of entries in the example load queue 210 above, an equal number of entries are not needed in load queue 210 and store queue 215. Store queue 215 holds stores from dispatch until the store data is written to data cache 220.

Data cache 220 caches data until storage in L2 235 is performed. Data cache 220 is a hardware or software component that stores data so requests for that data can be served faster. Data stored in data cache 220 can be the result of an earlier computation, the duplicate of data stored elsewhere, or store data from store queue 215. L2 235 may be a slower and/or larger version of data cache 220.

LS unit 139 dynamically reorders operations, supporting both load operations using load queue 210 bypassing older loads and store operations using store queue 215 bypassing older non-conflicting stores. LS unit 139 ensures that the processor adheres to the architectural load/store ordering rules as defined by the system architecture of processor 100 via load queue 210 and store queue 215.

LS unit 139 supports store-to-load forwarding (STLF) when there is an older store that contains all of the load's bytes, and the store's data has been produced and is available in the store queue 215. The load from STLF does not require any particular alignment relative to the store as long as it is fully contained within the store.

In the computing system including processor 100, certain address bits are assigned to determine STLF eligibility. Importantly, the computer system avoids having multiple stores with the same address bits, destined for different addresses in process simultaneously. This is the case where a load may need STLF. Generally, loads that follow stores to similar address bits use the same registers and accesses are grouped closely together. This grouping avoids intervening modifications or writes to the register used by the store and load when possible. This allows LS unit 139 to track "in-flight" loads/stores. For example, the LS unit 139 may track "in-flight" cache misses.

LS unit 139 and the associated pipelines 225A, 225B, 230 are optimized for simple address generation modes. Base+displacement, base+index, and displacement-only addressing modes (regardless of displacement size) are considered simple addressing modes and achieve 4-cycle load-to-use integer load latency and 7-cycle load-to-use floating point (FP) load latency. Addressing modes where both an index and displacement are present, such as commonly used 3-source addressing modes with base+index+displacement, and any addressing mode utilizing a scaled index, such as ×2, ×4, or ×8 scales, are considered complex addressing modes and require an additional cycle of latency to compute the address. Complex addressing modes achieve a 5-cycle integer/8-cycle floating point load-to-use latency. Generally, these systems operate by avoiding complex addressing modes in latency-sensitive code, such as scaled-index or index+displacement.

Figure 3:
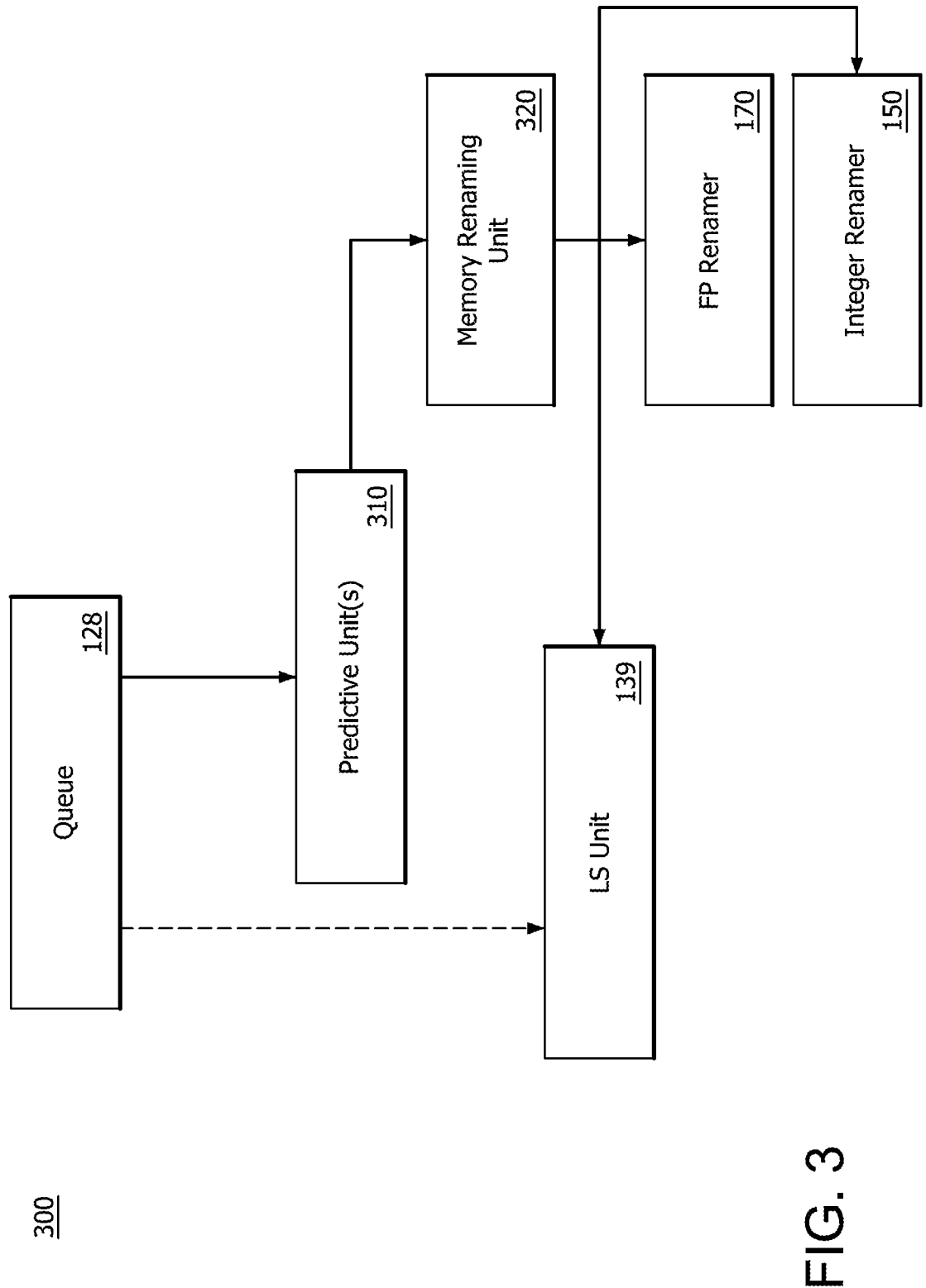
FIG. 3 illustrates a step diagram of a system tracking and/or predicting stores and loads by bypassing a load store unit.

FIG. 3 illustrates a step diagram of a system 300 tracking and/or predicting stores and loads by bypassing a load store unit. System 300 is generalized so that concepts can be presented clearly and many of the elements of FIGS. 1 and 2 are removed to aid in understanding. The micro-op queue 128 stores and queues up the micro-ops for dispatching for execution. Traditionally, this is performed directly within the LS unit 139. Alternatively, this storing and queueing may be performed by tracking and/or predicting stores and loads and bypassing the LS unit 139. A predictive unit 310 is utilized in order to identify conditions or scenarios where the LS unit 139 may be bypassed. That is, when store-to-load forwarding may be utilized. Predictive unit 310 operates using a single predictive or bypassing configuration or operates using multiple predictive and bypassing configurations as will be further described.

In the event that predictive unit 310 determines that the LS unit 139 is to be bypassed, the memory renaming unit 320 is alerted that the micro-op in question may be renamed and store-to-load forwarding utilized. Memory renaming unit 320 then provides information to FP renamer 170 and integer renamer 150, and in the case where feedback is being used for memory renaming via predictive unit 310, to LS unit 139.

Figure 4:
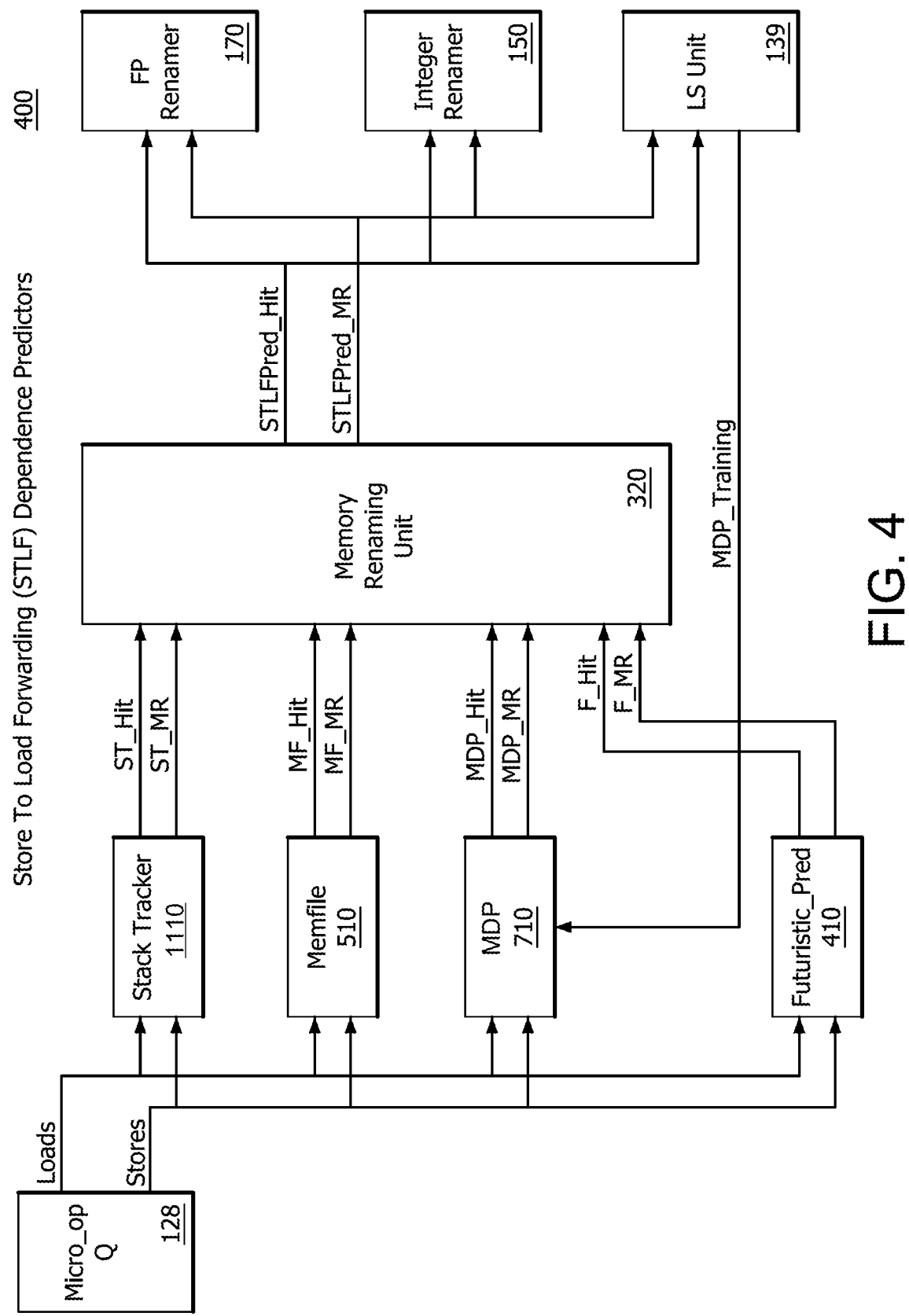
FIG. 4 illustrates a more detailed example of the system of FIG. 3 for store-to-load forwarding with dependence predictors.

FIG. 4 illustrates a more detailed example system 400 for store-to-load forwarding with dependence predictors. System 400 includes micro-op queue 128 that has loads and stores as part of the pipeline processing described above. Those loads and stores are provided to predictive unit(s) 310. In this illustration, system 400 includes a MEMFILE 510, a Memory Dependency Predictor (MDP) 710, a stack tracker 1110, and other predictors 410. Inputs to of MEMFILE 510, MDP 710, stack tracker 1110, and other predictors 410 are the loads and stores from micro-op queue 128. Each of MEMFILE 510, MDP 710, stack tracker 1110, and other predictors 410 operates on the loads and stores as will be described for each predictor below and provides outputs to the memory renaming unit 320. Specifically, MEMFILE 510 provides outputs MF_Hit and MF_MR to memory renaming unit 320. MDP 710 provides outputs MDP_Hit and MDP_MR to memory renaming unit 320. Stack tracker 1110 provides outputs ST_Hit and ST_MR to memory renaming unit 320. Other predictors 410 provide outputs F_Hit and F_MR to memory renaming unit 320.

The respective Hit and memory renaming (MR) outputs from the predictors to the memory renaming unit 320 indicate if a hit has occurred on a load or store that is to be operated on and required by micro-op queue 128. The Hit information contains the MdArn of the store and the store queue index. This information may be included with the load that had a hit and the load utilizes that information in the performance of the memory renaming.

Memory renaming unit 320 receives the input from the one or more predictors 310, including MEMFILE 510, MDP 710, stack tracker 1110, and other predictors 410, and provides an output of a store-to-load predicted hit and memory renaming illustrated as STLFPred_Hit and STLF-Pred_MR. These signals indicate that the store/load produced a hit for memory renaming and provide information on the location of the data. The Hit information again contains the MdArn of the store and the store queue index. This information is included with the load that had a hit and the load utilizes that information to perform memory renaming. The memory renaming unit 320 may prioritize between the different predictions based on agreement and conflict of the various techniques.

The output of memory renaming unit 320 is provided to each of FP Renamer 170, Integer Renamer 150 and LS Unit 139 allowing the load to be memory renamed to the register stored by the store. This saves the load store retrieval steps indicated above.

In the FP renamer 170, the load is renamed such that the load receives the load data from the register that is associated with the MdArn of the store that the load is dependent on as opposed to receiving the load data from a memory read. In an implementation, a mov-elimination-chain may occur such that the load reads the physical register file (PRF) entry which was used to provide the data for the store.

In the integer renamer 150, the operation is similar to the FP renamer 170 for integer registers. The load is renamed such that the load receives the load data from the register that is associated with the MdArn of the store that the load is dependent on as opposed to receiving the load data from a memory read. In an implementation, a mov-elimination-chain may occur such that the load reads the physical register file (PRF) entry which was used to provide the data for the store.

The LS unit 139 utilizes the store queue ID to check if that store was the true provider of data to that load. If the store was not a true provider of data, the pipeline is flushed and the load is executed again without memory renaming.

In the case where a predictive unit 310 uses feedback, such as in the case where MDP 710 learns or trains as will be described below, LS unit 139 provides an output (feedback) to the predictive unit 310 for learning. In this depiction, MDP 710 receives an output from LS unit 139.

Figure 5:
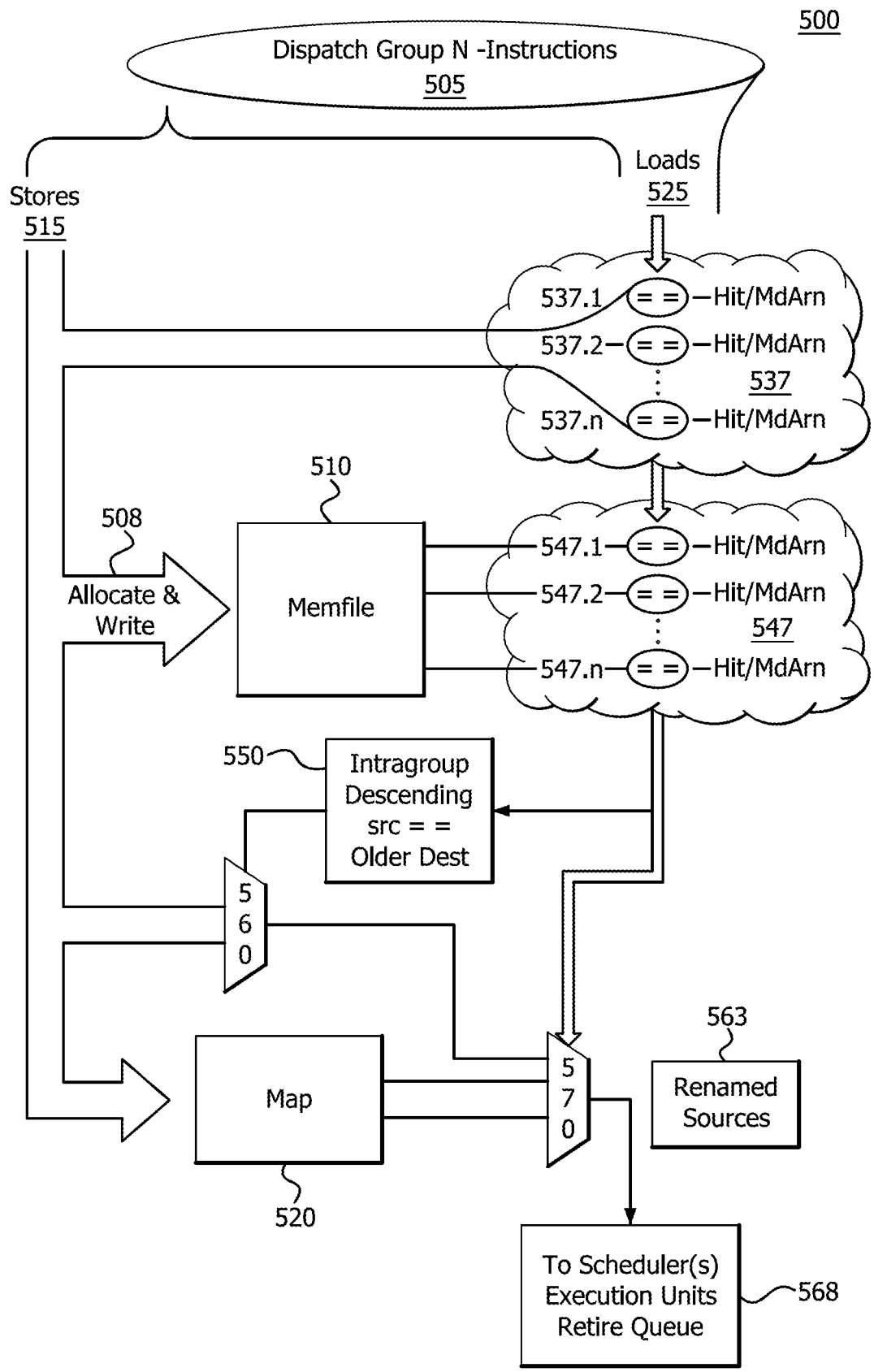
FIG. 5 illustrates a hardware flow of memory renaming in conjunction with LS unit within the core processing unit of FIG. 1 using an in-cache memory file (MEMFILE)

FIG. 5 illustrates a hardware flow 500 of memory renaming in conjunction with LS unit 139 within the core processing unit 105 of FIG. 1 using MEMFILE 510. FIG. 5 shows the hardware flow 500 of tracking stores and loads by bypassing the LS unit 139. Specifically, memory renaming is the method for tracking stores and loads to the same address while bypassing the LS unit 139 when a load follows an associated store. Memory renaming is used to optimize the forwarding of data from store to load. The use of memory renaming generally operates without involving the resources of LS unit 139. The LS unit 139 operates in memory renaming to check the load and the store as being truly to the same address and that there were no other intervening stores to that address. This is due to the fact that the dependency detection before the renaming stage is a prediction. In essence, memory renaming enables data to be "remembered" in integer scheduler and/or execution unit 130 and floating point scheduler and/or execution unit 132.

In general, in order to enable the "remembering", micro architectural registers that are memory dependent architectural register numbers (MdArns) are utilized. The MdArns serve as the location for "remembering" data that has been stored to be used on a subsequent load. The MdArns are utilized even though the data is also stored in traditional memory stores. The traditional memory stores occur through the LS unit 139. MdArns are architectural register numbers (micro-architectural register numbers that are not directly accessible by software) that are a part of and accessible to integer renamer 150 and/or floating point renamer 170 shown in FIG. 1. This allows integer renamer 150 and/or floating point renamer 170 to load data from an MdArn ("remembering") without the need to request the data from the LS unit 139.

In an implementation, the information regarding the MdArns is stored in a map 520. Map 520 is a file that includes the MdArn map, which provides the map to what has been stored in specific MdArns. The MdArns are not architecturally visible and are only used internally for memory dependent renaming. Specifically, each entry in map 520 contains a physical register number (PRN) which is an index of the physical register file (PRF) 160,178 where the given store data is written, in addition to being sent to the LS unit 139. Map 520 enables store data to be forwarded locally to loads and load dependents through renaming using the associated store's MdArn. There are N number of MdArns.

Hardware flow 500 illustrates the dispatching of N-instructions 505. The N-instructions instructions 505 are stored as described above with respect to FIGS. 1 and 2. In addition to the storing process detailed in those figures, stores 515 also use MdArns including a plurality of individual MdArns 537.1, 537.2 . . . 537.n. While FIG. 5 illustrates dispatching N number of MdArns in map 520, the number of intergroup dependencies is constrained by the number of operations that are dispatched simultaneously, such as 6 operations in a 6-wide architecture, for example. Address information for any stores 515 in the current dispatch group are written 508 into the MEMFILE 510 within the decode unit 110, assigned an MdArn, and renamer 150,170 to map it to a free PRN, storing it in the map 520 just as is done with mapped ARNs. If there are multiple stores to the same address within a dispatch group, only the oldest store is stored in the MEMFILE 510 and renamed to an MdArn. MEMFILE 510 is an in-memory file cache.

Older stores are defined by program order. Within a common dispatch grouping, operations are in program order. Intergroup dependencies are checked to ensure the correct source. The oldest operation is not dependent on any of the younger operations. For example, the second oldest operation can be dependent on the oldest operation while the youngest operation can be dependent on any of its older operations.

Stores 515 are allocated and written 508 to MEMFILE 510 and identified in map 520. As stores 515 are directed to MEMFILE 510 and identified in map 520, they are also compared against dispatch loads 525 for address matches, as shown in 537 (537.1, 537.2 . . . 537.n). Additionally, dispatched loads 525 are checked for address matches against stores previously written in the MEMFILE 510, depicted in 547 (547.1, 547.2 . . . 547.n). Loads 525 whose address match a store in compare logic 537 and 547 are associated with the given store, undergo intergroup dependency checking (550,560,570), and are then mapped to the PRN denoted by the stores MdArn.

In an implementation, scheduler and/or execution unit 115 monitors each store 515, in order, in the MEMFILE 510, which is within the decoder 126. In short, in an implementation, the MEMFILE 510 is an age ordered rotating first-in, first-out (FIFO) queue allocated with each store 515 that is dispatched. Dispatch is when instructions have been decoded and are sent to the renamer and scheduling queues (563,568), such as between micro-op queue 128 and renamer 150 (in the case of the integer renamer). Each entry within MEMFILE 510 contains information about the store 515, such as the base and index registers within physical register file 160 and includes part of the displacement. This store 515 gets allocated an MdArn, of which there are N, in a rotating manner.

In scheduler and/or execution unit 115, the stores 515 operate as described herein above with respect to FIGS. 1 and 2. The store 515 splits into an address generation component and a store 515 data movement to LS unit 139. For memory renaming, the store 515 also includes moving the store data to the MdArn. During store data movement to the LS unit 139, the physical register file 160 is written for the PRN allocated to that MdArn in map 520.

Memory renaming reduces STLF latency by changing it to a register-to-register move. A subset of operations could additionally be combined with move elimination to be accomplished in mapping only, reducing STLF to zero cycle latency.

If the load 525 is a load-operation or a pure-load, the operand that would normally come from memory, such as cache 134 or L2 136, or other memory, for example, is instead provided by MdArn. The load 525 executes an address generation and LS unit 139 verifies the correctness of the memory renaming flow 500. LS unit 139 abstains from returning data. Additionally, the LS unit 139 checks that there have been no intermediate stores to the given address which breaks the renamed store-load association. If verification fails, LS unit 139 resynchronizes load 525 by re-performing load 525. The resynchronizing of load 525 includes re-performing all of the work that has been performed, flushing the pipeline and starting the execution from scratch beginning with the load.

Figure 6:
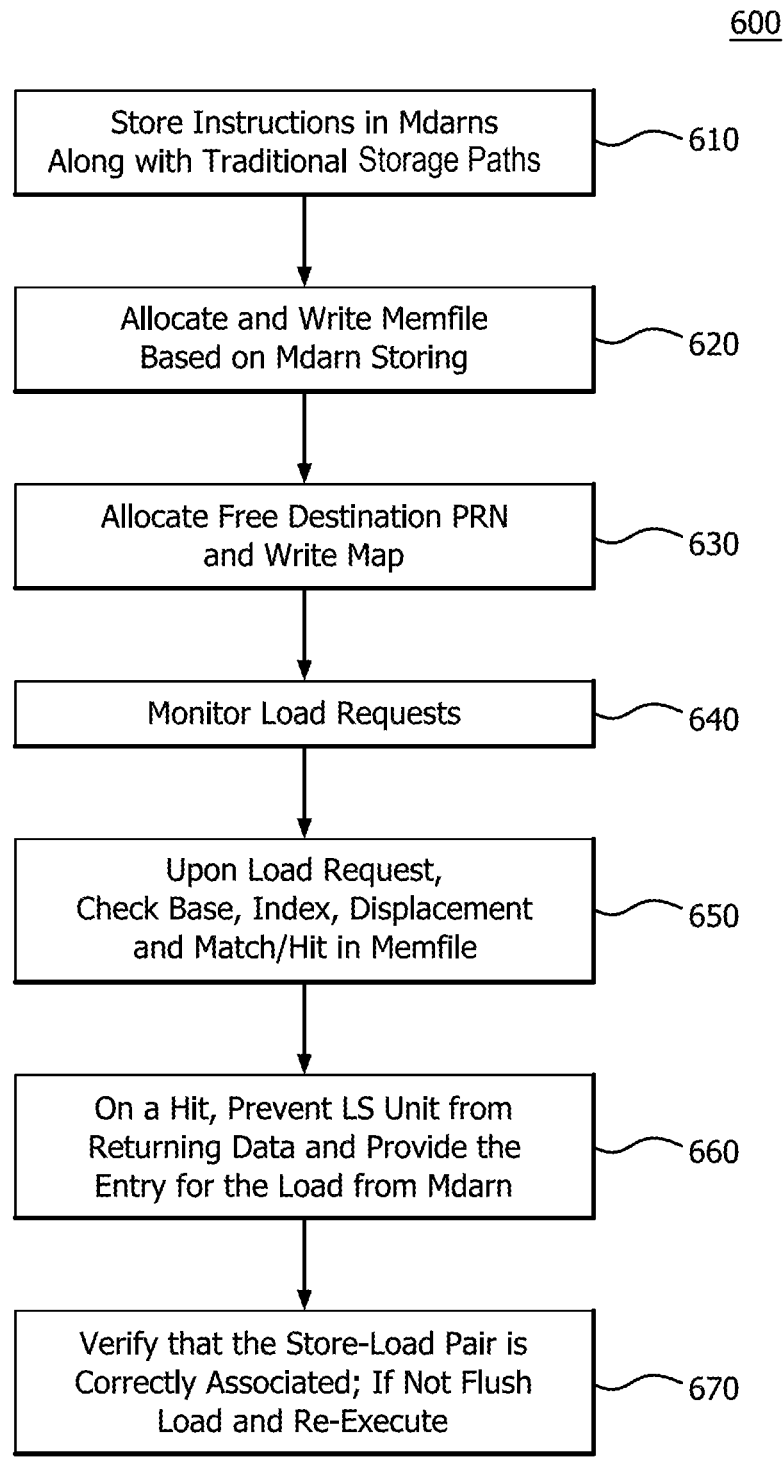
FIG. 6 illustrates a method for memory renaming in conjunction with LS unit within the core processing unit of FIG. 1 using MEMFILE.

FIG. 6 illustrates a method 600 for memory renaming in conjunction with LS unit 139 within the core processing unit 105 of FIG. 1 using MEMFILE 510. Method 600 includes storing instructions in MdArns along with the traditional storage path at step 610. At step 620, method 600 allocates and writes to a MEMFILE 510 based on MdArn storage. The free destination PRN is allocated to be used and a map is written at step 630. The system monitors load requests at step 640. Upon on a load request, the base, index, displacement and match/hit in MEMFILE 510 are checked within the dispatch logic where MEMFILE 510 resides, such as between micro-op queue 128 and map 520 (within renamer 150 as discussed) at step 650. On a hit, the LS unit 139 is prevented from returning data and provides the entry for the load from MdArn identified from MEMFILE 510 at step 660. At step 670, the LS unit 139 verifies that the store-load pair is correctly associated. If it is not, the load is flushed and re-executed.

Figure 7:
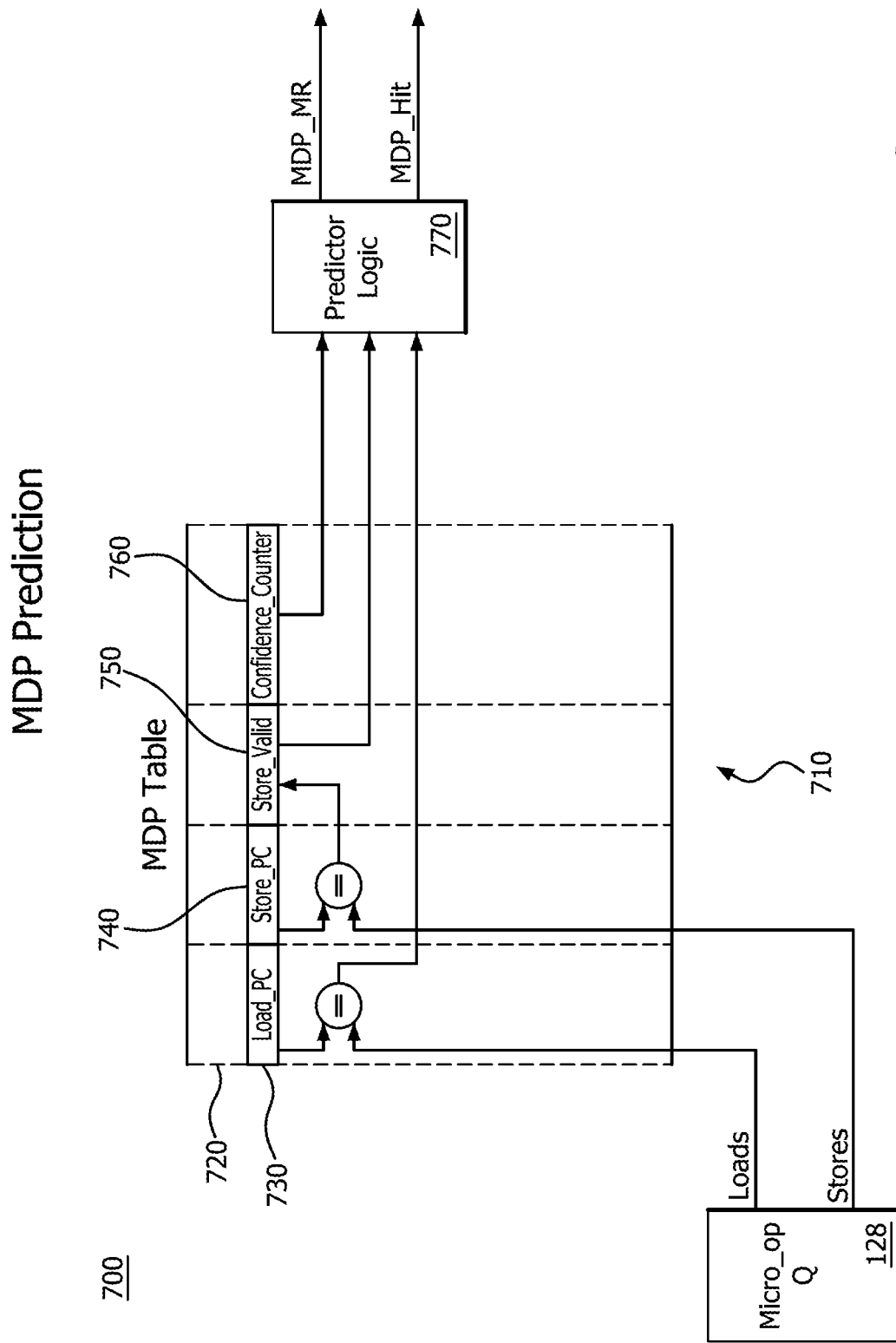
FIG. 7 illustrates the prediction process and hardware flow of memory renaming in conjunction with LS unit within the core processing unit of FIG. 1 using a memory dependence predictor (MDP)

FIG. 7 illustrates a hardware flow 700 of memory renaming in conjunction with LS unit 139 within the core processing unit 105 of FIG. 1 using MDP 710. FIG. 7 shows the prediction process and hardware flow 700 of tracking stores and loads by bypassing the LS unit 139 similar to FIG. 5. As set forth, memory renaming is the method for tracking stores and loads to the same address while bypassing the LS unit 139 when a load follows an associated store. Memory renaming is used to optimize the forwarding of data from store to load. The use of memory renaming generally operates without involving the resources of LS unit 139. In essence, memory renaming enables data to be "remembered" in integer scheduler and/or execution unit 130 and floating point scheduler and/or execution unit 132 via the integer or floating point register file.

MDP 710 is a prediction that identifies store-load pairs that have demonstrated a history of STLF. Once the identification occurs, the load is memory renamed to the register stored by the store. Additionally, the MDP 710 is used to detect loads that are dependent on a store but lack the expected benefit from memory renaming because of the insufficient confidence that the store truly forwards its data to the load. In such a situation, the MDP 710 signals the dependency to the LS unit 139 and LS unit 139 uses the information for other purposes, such as to issue the load after the identified store has its physical address. The MDP 710 uses one or more prediction tables 720 which may be located in the decoder and are trained by the LS unit 139 based on store-to-load interaction (STLI) events. Using the MDP table 720, the decoder detects potential store to load dependencies and signals these dependencies for memory renaming. When memory renaming is performed, the LS unit 139 performs address matching between the load and the store to confirm the prediction and to ensure that the store truly forwards its data to the load.

More specifically, in FIG. 7 the hardware flow 700 is initiated by receiving information for a load or store from the micro-op queue 128. The load or store is compared to the values in table 720. The values include load and store information. Table 720 includes columns Load-PC 730, Store-PC 740, Store-Valid 750 and Confidence_Counter 760, for example. Table 720 may include any number of entries, although a number from 10-50 may be operable. Specifically, 24 entries may be used.

Table 720 includes store and load instruction addresses (Store-PC 740 and Load-PC 730) or other unique identifiers that are available when the instructions dispatch.

The store is compared to the values in the column Store_PC 740. When a store matches one or more entries in table 720, the store associates with the matched entry and enters the MdArn associated with the store, Store Queue ID, and other identifying information. The output of the comparison of the store and the contents in column Store-PC 740 is then sent to column Store-Valid 750. In Store_Valid column 750, it is determined if the store is valid by comparing the store to the entries in column 750. The determination from the validity of the store is then provided to predictor logic 770.

The load is compared to the values in the column Load_PC 730. When a load matches (or hits) an active entry in the table 720, the MdArn of the store, the Store Queue ID, and other information from the store are read. The read entries are used to memory rename the store and the load if the confidence count of the entry is above a threshold as will be described. Once a load hits on an active entry, the entry is deactivated. Entries may also be deactivated when the MdArn, which a matching store wrote to an entry, is reused for a newer (or younger) store or any other event that renders the store entry invalid. The output of the comparison of the load and the contents in column Load_PC 730 is sent as an input to predictor logic 770.

Confidence_Counter column 760 is queried to determine the confidence level of the store and the determined confidence level is provided to predictor logic 770. Confidence_Counter column 760 includes entries of a confidence field that may be, for example, 5 bits indicating a value from 0-31 regarding the confidence of the load-store match. Queries to this column check against the entries in the column. After forwarding a load-store pair in the first instance, the confidence value may be set at 15, for example. The training of the confidence variable is explained in more detail below.

Predictor logic 770 inputs an indication of the table 720 matches for the load from Load PC column 730 and the store from Store-PC column 740 via Store-Valid column 750 to determine if the load and store both hit on the same entry and have a predicted dependency. The confidence score associated with the hit from Confidence_Counter column 760 is also provided to predictor logic 770. Based on the value of the Confidence_Counter column 760, predictor logic 770 determines if the store load matching is sufficiently confident for memory renaming. For example, if the confidence value is greater than 20, then any hit is valid and STLF continues and memory renaming is performed. If the confidence value is less than 10, the hit may be determined to be insufficiently confident and memory renaming is not performed. The predicted dependency may be used for other purposes, such as those described herein. Other values within the 0-31 range may be used for confidence scoring, including values above and below 15 for example. The predictor logic 770 outputs the MDP_MR and MDP_Hit signals discussed above in FIG. 4. MDP_MR and MDP_Hit are determined for loads and indicate that the predictor predicted the load to have a dependency on a store. If such a hit exists, MDP_MR/MDP_Hit communicate the MdArn, Store Queue ID and other information regarding the store. MDP_MR/MDP_Hit may also indicate whether the confidence value is sufficiently high that memory renaming may be performed allowing the LS unit 139 to be bypassed and STLF to be used.

Figure 8:
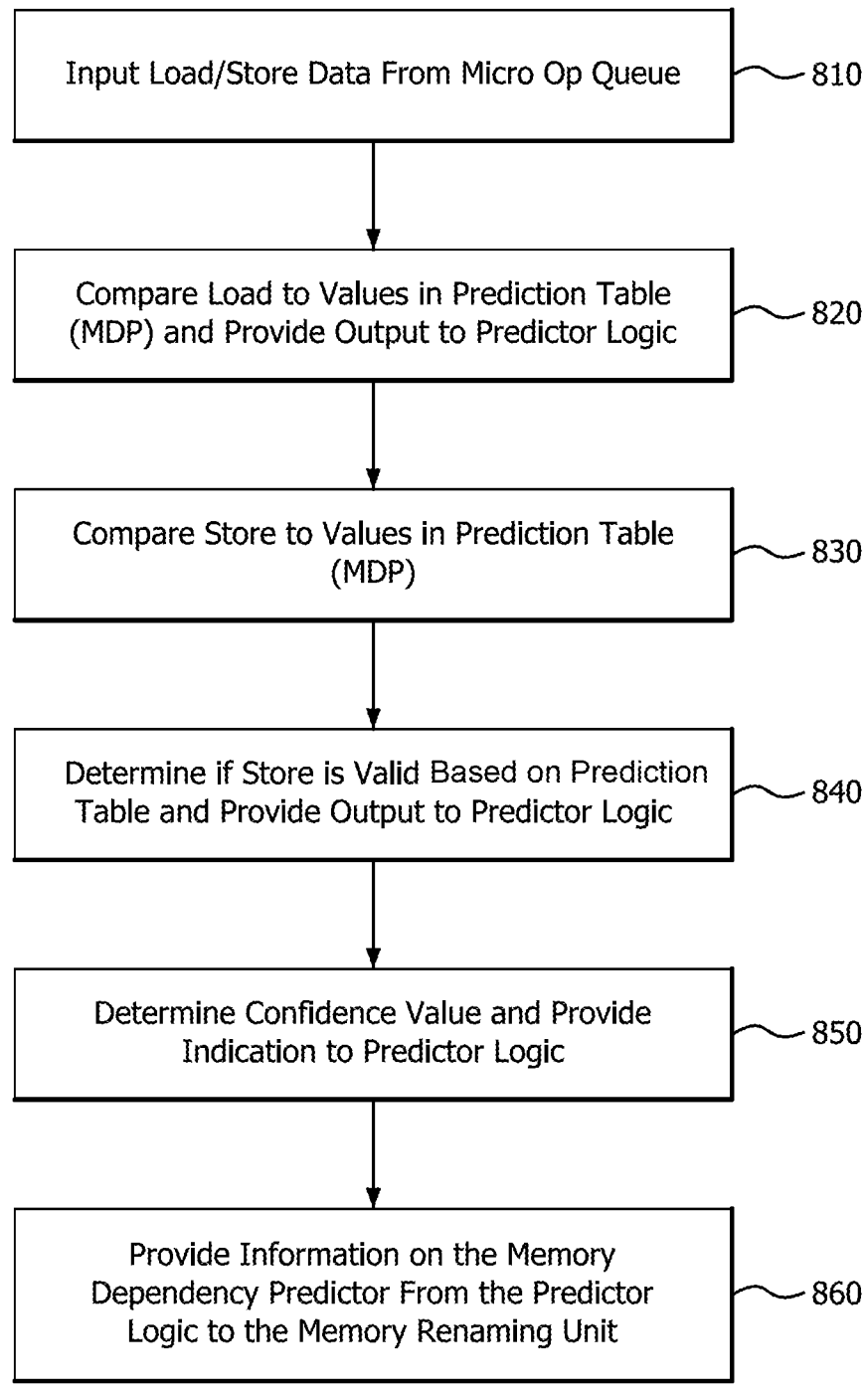
FIG. 8 illustrates a method performed in the hardware of FIG. 1 for the hardware flow of FIG. 7 in performing the MDP prediction.

FIG. 8 illustrates a method 800 performed in the hardware of FIG. 1 for the hardware flow 700 of FIG. 7 in performing the MDP prediction. The MDP prediction uses the store/load instruction address or a sufficiently unique representation of the address to predict hits for memory renaming. Method 800 includes inputting load and store instruction information from the micro op queue at step 810. At step 820, the load value is compared to values in a prediction table (MDP) and an output of the comparison is provided to the predictor logic. At step 830, the store value is compared to values in the prediction table (MDP). Based on the comparison in step 830, at step 840, it is determined from the prediction table if the store is valid and an output, based on the comparison of step 830 and determination in step 840, is provided to the predictor logic. At step 850, a confidence value that indicates the confidence level of the match for the load/store is determined and provided to the predictor logic. At step 860, the predictor logic provides information on the memory dependency predictor to the memory renaming unit.

Figure 9:
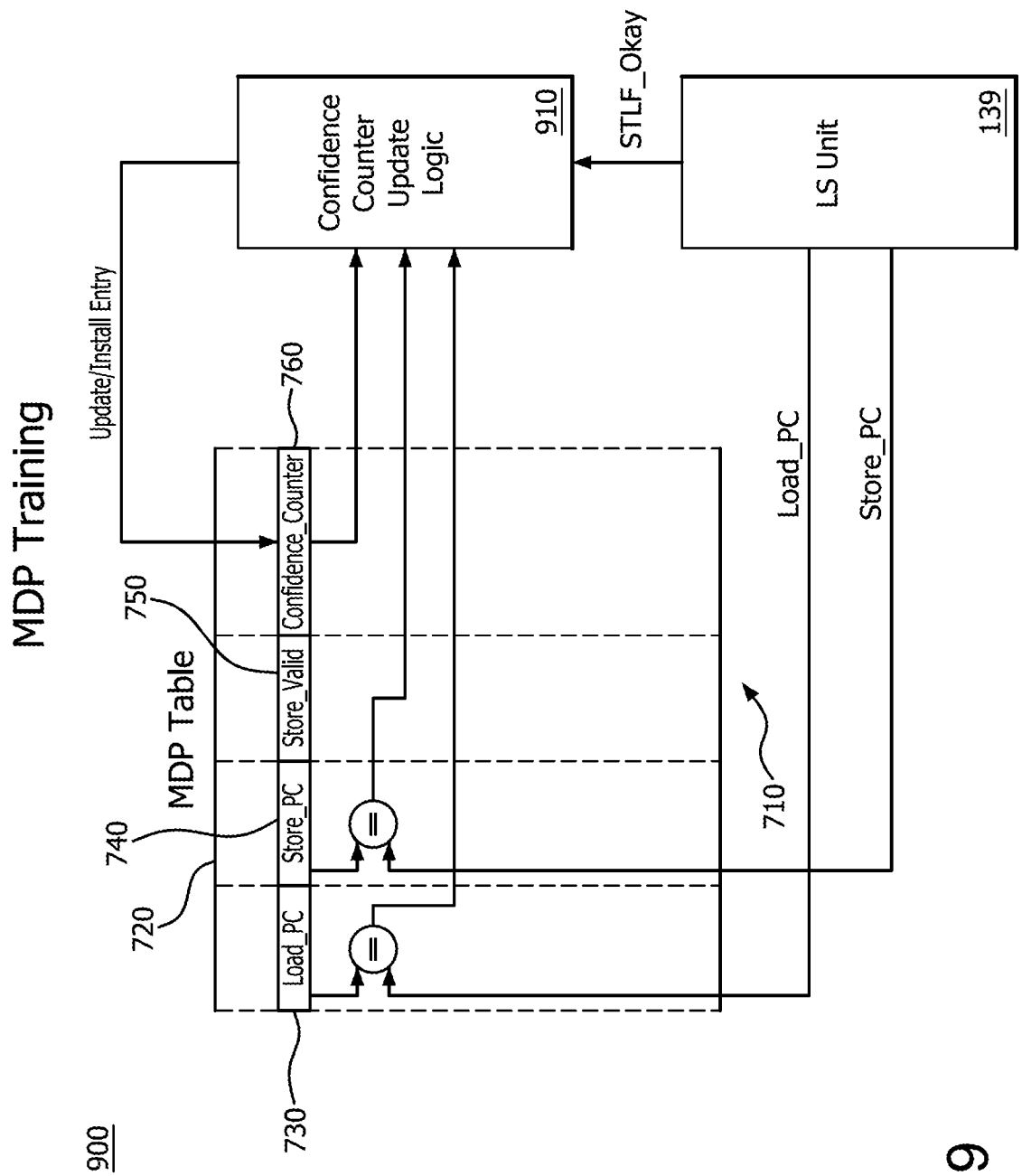
FIG. 9 illustrates a hardware flow of memory dependency prediction learning with LS unit within the core processing unit of FIG. 1 using MDP.

FIG. 9 illustrates a hardware flow 900 of memory dependency prediction learning with LS unit 139 within the core processing unit 105 of FIG. 1 using MDP 710. MDP 710 includes MDP table 720 again having Load_PC column 730, Store_PC column 740, Store_Valid column 750, and Confidence_Counter column 760. In order to provide training for MDP 710, the LS unit 139 tracks the load/stores using Load_PC and Store_PC that are linked to Load_PC column 730 and Store_PC column 740, respectively. As the LS unit 139 tracks the load/stores, a determination is made as to the validity of the STLF and a signal is passed from the LS unit 139 to confidence counter update logic 910. This signal indicates that the store load process is acceptable, for example.

The confidence counter update logic 910 also receives as input, similar to predictor logic 770 of FIG. 7, an indication of the comparison of the input load value to those in the prediction table in Load_PC column 730, an indication of the comparison of the store value to those in the prediction table in Store_PC column 740, and an indication from the Confidence_Counter column 760 regarding the confidence of the match. Based on the input of whether the STLF was acceptable from the LS unit 139, the confidence counter update logic 910 uses the other inputs to increment or decrement the confidence counter field in Confidence_Counter column 760. The confidence counter field may also be created if one was not already included in table 720.

If the correct hit is determined in the confidence counter update logic 910, the confidence value in the Confidence_counter column 760 may be incremented by 1. If the wrong hit is determined in the confidence counter update logic 910, the confidence value in the Confidence_counter column 760 may be decremented by 1. While this example uses increment/decrement by a single unit, other values may be used, such as by 2, 3 or even 5 and the increment and decrement values may be unequal.

Figure 10:
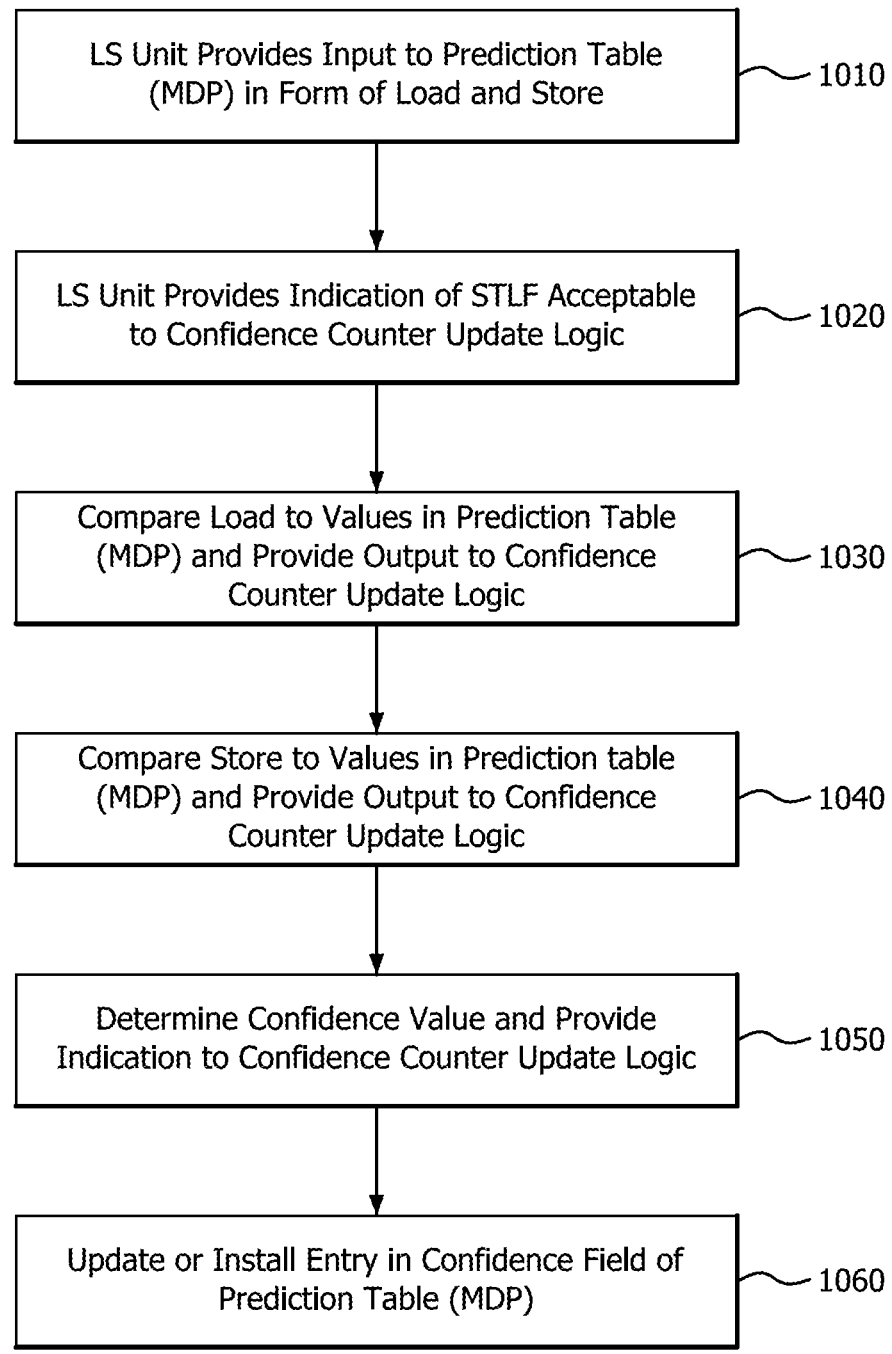
FIG. 10 illustrates a method performed in the hardware of FIG. 1 for the hardware flow of FIG. 9 in performing the MDP training.

FIG. 10 illustrates a method 1000 performed in the hardware of FIG. 1 for the hardware flow 900 of FIG. 9 in performing the MDP training. LS unit 139 provides an input to the prediction table (MDP) in the form of a load and store at step 1010. The LS unit 139 provides an indication of whether STLF is acceptable given the load and store to confidence counter update logic at step 1020. At step 1030, the load value is compared to values in a prediction table (MDP) and an output of the comparison is provided to the confidence counter update logic. At step 1040, the store value is compared to values in the prediction table (MDP) and an output of the comparison is provided to the confidence counter update logic. At step 1050, a confidence value that indicates the confidence level of the match for the load/store is determined and provided to the confidence counter update logic. At step 1060, the confidence counter update logic provides information on the memory dependency predictor to the MDP table 710. Specifically, the confidence counter update logic updates or installs an entry in Confidence_Counter column 760 of MDP table 720.

Figure 11:
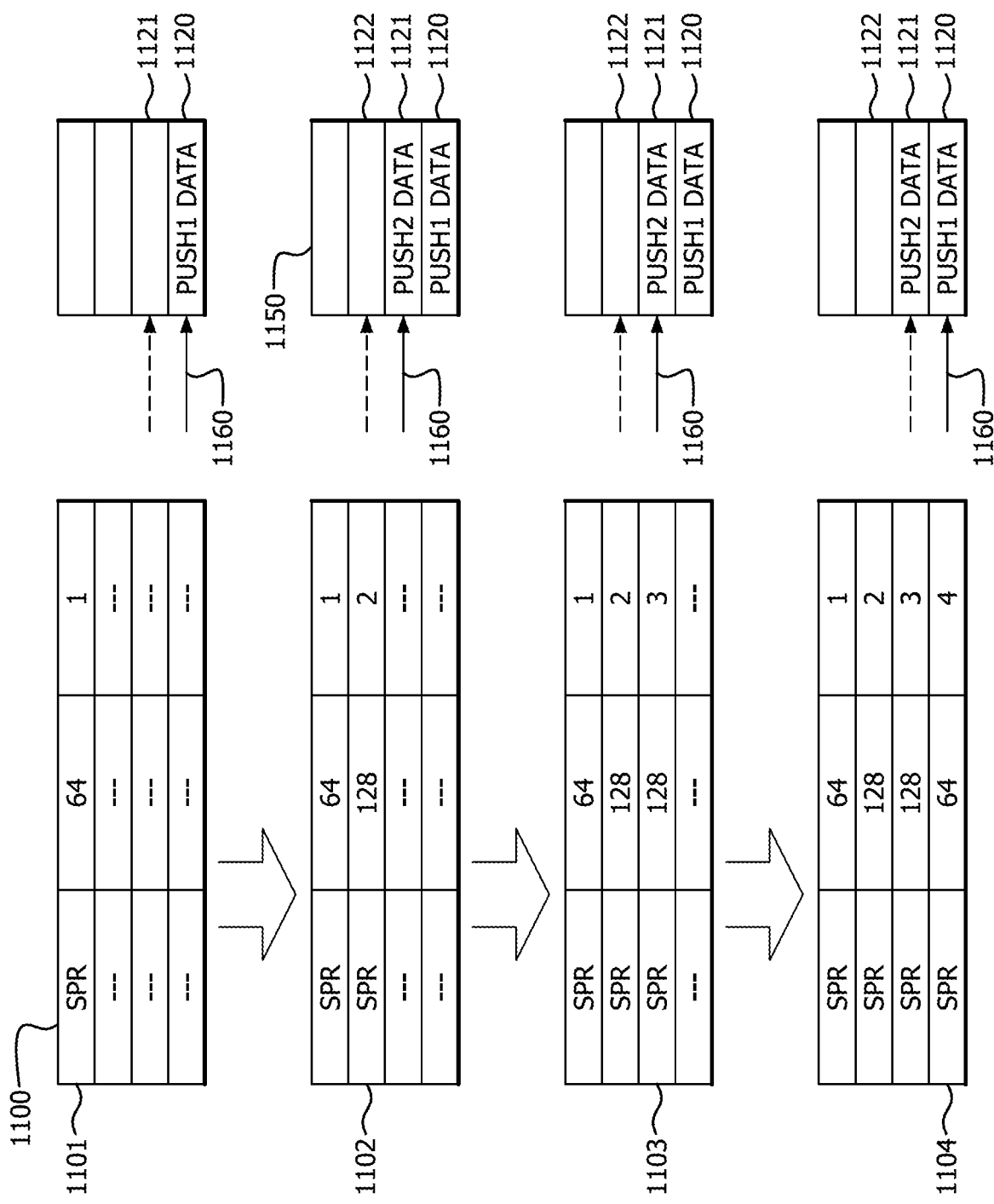
FIG. 11 illustrates an example of the stack tracker using the dependency prediction table for stack access instructions.

FIG. 11 illustrates an example of the stack tracker 1110 using the dependency prediction table 1100 for stack access instructions. FIG. 11 also illustrates how execution of the stack access instructions affects data stored at a stack 1150 and how execution of the stack access instructions change the value of a stack pointer 1160. In the illustrated example, the stack tracker 1110 initially stores, at entry 1101 of the dependency prediction table 1100, instruction information for a push instruction (corresponding to the PUSH1 instruction from the example above) that sets the stack offset at 64 bytes.

The stack 1150 includes a set of entries, such as entries 1120 and 1121, whereby each entry has the same size. In the illustrated example, it is assumed that each entry is 64 bytes. In the illustrated example, the stack pointer 1160 has previously been initialized to a given entry of the stack 1150, defined as the base of the stack 1150. To execute the PUSH 1 instruction, the execution unit 115 accesses the stack pointer register to determine the memory address for the store operation associated with the PUSH1 instruction. In the illustrated example, that memory address corresponds to the base of the stack 1150 (entry 1120), as indicated by the position of the stack pointer 1160. The LS unit 139 executes the store operation for the PUSH1 operation to store the data associated with the PUSH1 operation (designated "PUSH1 DATA") at entry 1120. In addition, the execution unit 115 adds the value 64 to the value stored at the stack pointer register, thereby causing the stack pointer to point at entry 1121. Thus, execution of the PUSH1 instruction causes the stack pointer 1160 to be offset, relative to the base of the stack 1150, by 64 bytes, corresponding to the offset reflected at entry 1101 of the dependency prediction table 1100.

Subsequent to storing the information for the PUSH1 instruction, but before the PUSH1 instruction is executed, the stack tracker 1110 stores, at entry 1102 of the dependency prediction table 1100, instruction information for a second received push instruction (corresponding to the PUSH2 instruction) that sets the stack offset at 128 bytes. In the illustrated example, execution of the PUSH2 instruction is similar to execution of the PUSH1 instruction discussed above, and causes the data for the PUSH2 instruction (designated "PUSH2 DATA") to be stored at entry 1121 of the stack 1150. In addition, execution of the PUSH2 instruction causes the stack pointer 1160 to be adjusted so that it points to entry 1122 of the stack 1150. Accordingly, execution of the PUSH2 instruction causes the stack pointer 1160 to be offset by 128 bytes relative to the base of the stack 1150, corresponding to the offset stored at entry 1102 of the dependency prediction table.

Subsequent to storing the information for the PUSH2 instruction, but before the PUSH1 and PUSH2 instructions are executed, the stack tracker 1110 receives instruction information for a POP instruction (corresponding to the POP1 instruction) that accesses the stack at an offset of 128 bytes and stores the information at entry 1103 of the dependency prediction table 1100. Accordingly, based on the offset information stored at entries 1102 and 1103, the stack tracker 1110 predicts that the POP1 instruction is dependent on the PUSH2 instruction, and indicates the prediction to the fixed point unit. In response, the fixed point unit forwards the store data for the PUSH2 instruction to the target PRN for the POP1 instruction. The execution unit 115 executes the operations for the POP1 instruction by first reducing the value of the stack pointer 1160 by 64 bytes so that it points at entry 1121, and then performing a load operation using the stack pointer as the load address. The POP1 instruction would therefore cause the PUSH2 data to be loaded to the target PRN designated by the POP1 instruction, but because the data has already been forwarded, the load operation does not need to retrieve the PUSH2 data from memory, improving instruction throughput. The offset for the POP1 instruction, relative to the base of the stack 1150, corresponds to the value of the stack pointer before it is adjusted for the load operation, and is therefore equal to 128 bytes, corresponding to the offset stored at entry 1103 of the dependency prediction table 1100.

Subsequent to receiving the information for the POP1 instruction, and prior to execution of the PUSH2 instruction, the stack tracker 1110 receives instruction information for a POP instruction (corresponding to the POP2 instruction) that accesses the stack at an offset of 64 bytes, and stores the information at entry 1104 of the dependency prediction table 1100. Based on the offset information stored at entries 1101 and 1104, the stack tracker 1110 predicts that the POP2 instruction is dependent on the PUSH1 instruction, and indicates the prediction to the fixed point unit. In response, the fixed point unit forwards the store data for the PUSH1 instruction to the target PRN for the POP2 instruction. The execution unit 115 executes the operations for the POP2 instruction by first reducing the value of the stack pointer 1160 by 64 bytes so that it points at entry 1120, and then performing a load operation using the stack pointer as the load address. The POP2 instruction would therefore cause the PUSH1 data to be loaded to the target PRN designated by the POP1 instruction, but because the data has already been forwarded, the load operation does not need to retrieve the PUSH1 data from memory. The offset for the POP2 instruction, relative to the base of the stack 1150, corresponds to the value of the stack pointer before it is adjusted for the load operation, and is therefore equal to 64 bytes, corresponding to the offset stored at entry 1103 of the dependency prediction table 1100.

Figure 12:
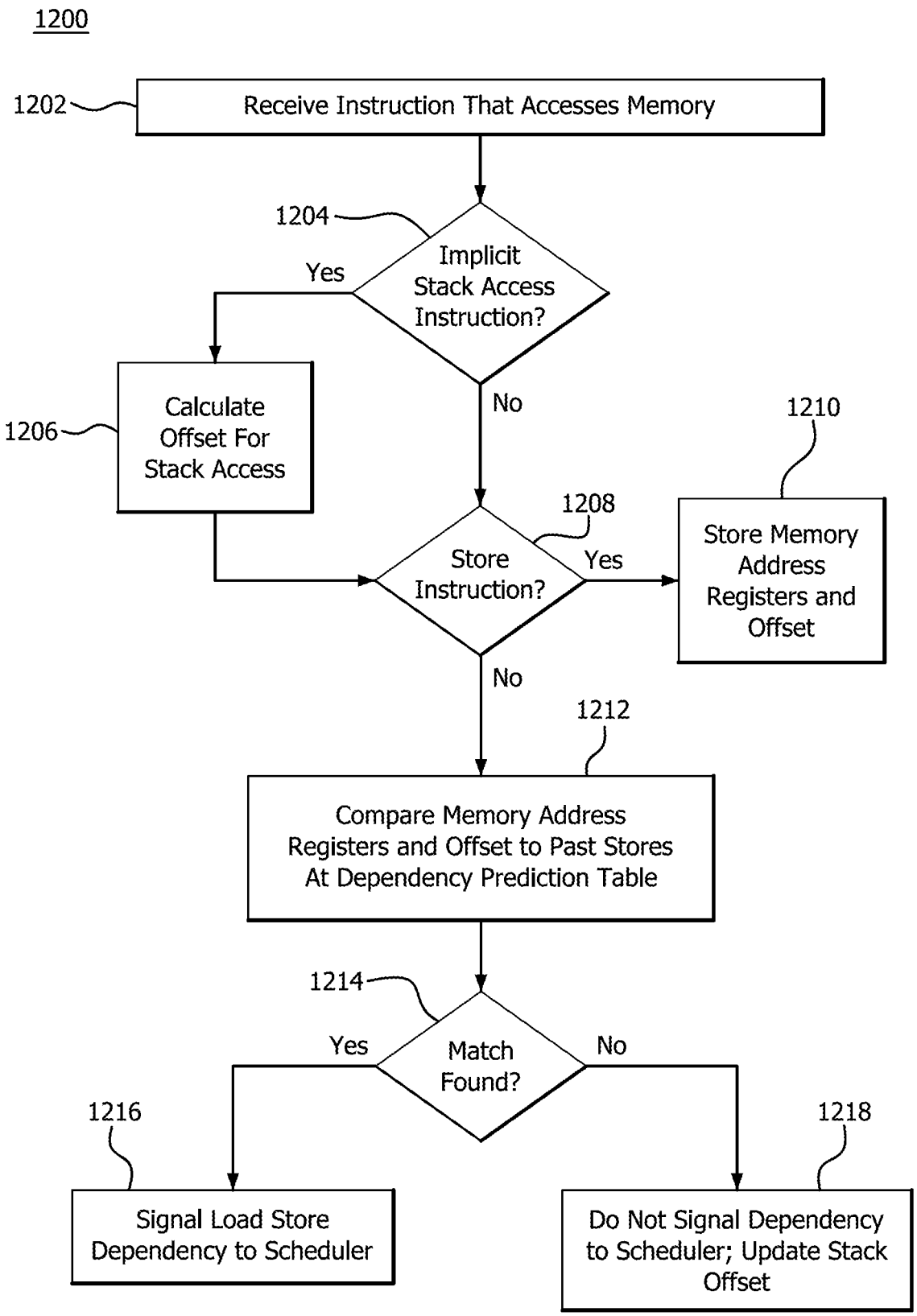
FIG. 12 illustrates a flow diagram of a method of tracking stack accesses at a processor.

FIG. 12 illustrates a flow diagram of a method 1200 of tracking stack accesses at a processor. The method 1200 is described with respect to an example implementation at the processor 100 of FIG. 1. At step 1202 the fetch stage receives, from the instruction cache, an instruction that accesses memory, such as a load/store instruction or a stack access instruction. At step 1204, the stack tracker 1110 determines, based on an op code of the instruction or other identifier, whether the instruction is an explicit load/store instruction or a stack access instruction based on whether the memory access instruction uses the stack pointer register as an operand. If the instruction is an explicit load/store instruction, the method flow proceeds to step 1208, described below. If the memory access instruction is a stack access instruction the method flow moves to step 1206 and the stack tracker 1110 calculates the offset for the stack access instruction. At step 1208 the stack tracker 1110 determines whether the memory access instruction stores data to memory (e.g., an explicit store instruction or a push instruction). If so, the method flow moves to step 1210 and the stack tracker 1110 stores either 1) the memory address targeted by the memory access instruction and the source register (in the case of an explicit store instruction) or 2) the calculated offset and the stack pointer register (in the case of a stack access instruction) at an entry of the dependency prediction table 1100.

If, at step 1208, the stack tracker 1110 determines the instruction loads data from memory (e.g., is an explicit load instruction or a stack access instruction that retrieves data from the stack such as a pop instruction) the method flow proceeds to step 1212 and the dependency predictor compares the memory address registers (e.g., the source registers of an explicit load) and the calculated offset (in the case of stack access instruction) to the entries of the dependency prediction table 1100. At step 1214 the stack tracker 1110 determines if the comparison indicates a match. If so, the method flow proceeds to step 1214 and the stack tracker 1110 indicates a predicted load/store dependency to the scheduler 115. The prediction enables store-to-load forwarding or other speculative operations for the load operation. If there is no match with a store instruction, the method flow proceeds to step 1218 and the stack tracker 1110 does not indicate a dependency to the scheduler 115, so that no speculative store-to-load forward takes place.

Figure 13:
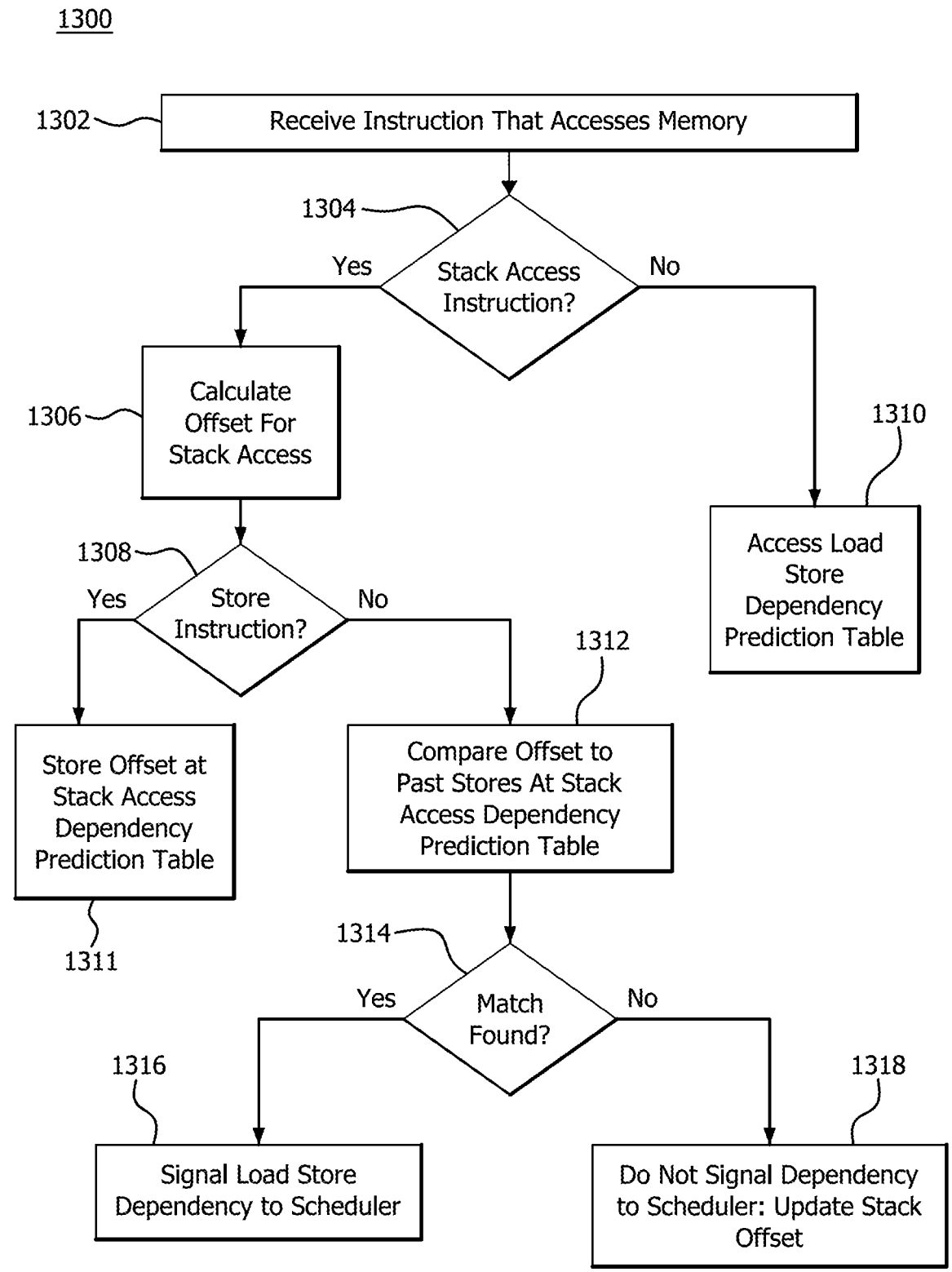
FIG. 13 illustrates a flow diagram of a method of tracking stack accesses at a processor.

FIG. 13 illustrates a flow diagram of a method 1300 of tracking stack accesses at a processor. The method 1300 is described with respect to an example implementation at the processor 100 of FIG. 1. At step 1302 the fetch stage receives, from the instruction cache, an instruction that accesses memory, such as a load/store instruction or a stack access instruction. At step 1304, the stack tracker 1110 determines, based on an op code of the instruction or other identifier, whether the instruction is an explicit load/store instruction or a stack access instruction based on whether the memory access instruction uses the stack pointer register as an operand. If the instruction is an explicit load/store instruction, the method flow continues to step 1310 and the dependency predictor accesses the load/store dependency prediction table 1100. For example, in some embodiments, the dependency predictor identifies the received instruction as an explicit load instruction, and compares the memory address registers (e.g., the source registers of an explicit load) and the displacement for the instruction to the entries of the load/store dependency prediction table 1100 and determines if the comparison indicates a match. If so, the stack tracker 1110 indicates a predicted load/store dependency to the scheduler 115. The prediction enables store-to-load forwarding or other speculative operations for the load operation. If there is no match with a store instruction the stack tracker 1110 does not indicate a dependency to the scheduler 115, so that no speculative store-to-load forward takes place.

Returning to step 1304, if the memory access instruction is a stack access instruction the method flow moves to step 1306 and the stack tracker 1110 calculates the offset for the stack access instruction. At step 1308 the stack tracker 1110 determines whether the memory access instruction stores data to the stack (e.g., a push instruction). If so, the method flow moves to step 1311 and the stack tracker 1110 stores the calculated offset at an entry of the stack access dependency prediction table 1100. If, at step 1308, the stack tracker 1110 identifies the memory access instruction as one that retrieves data from the stack (e.g., a pop instruction), the method flow proceeds to step 1312 and the stack tracker 1110 compares the calculated offset with the offsets stored at the stack access dependency prediction table 1100. In response to a match, the method flow moves to step 1316 and the stack tracker 1110 indicates, to the scheduler 115, a predicted dependency between the received stack access instruction and the stack access instruction that matched in the stack access dependency prediction table 1100. If, at step 1312, the stack tracker 1110 determines that there is not a match between the calculated offset and any of the offsets stored at the stack access dependency prediction table 1100, the method flow moves to step 1318 and the stack tracker 1110 does not identify a dependency to the scheduler 115.

FIGS. 11 through 13 present details on stack access tracking. Additional detail may be found in U.S. Pat. Nos. 9,292,292 and 9,367,310, each of which is incorporated by reference as if set forth in its entirety.

The present application presents multiple ways to determine when to utilize memory renaming to reduce retrieval latencies including prediction units 310, such as MEMFILE 510, MDP 710, stack tracker 1110, and other predictors 410. Some of these prediction units 310 utilize history of past predictions to provide predictions of load/stores that may benefit from renaming, such as MDP 710, and other prediction units 310 where little or no history is utilized, such as stack tracker 1110 and MEMFILE 510. Each of the prediction unit 310 techniques has strengths and weaknesses in predicting the load/stores that may benefit from memory renaming. In the present configuration, multiple ones of these prediction units 310 may be used in order to highlight the benefits of each and to minimize any weaknesses.

Figure 14:
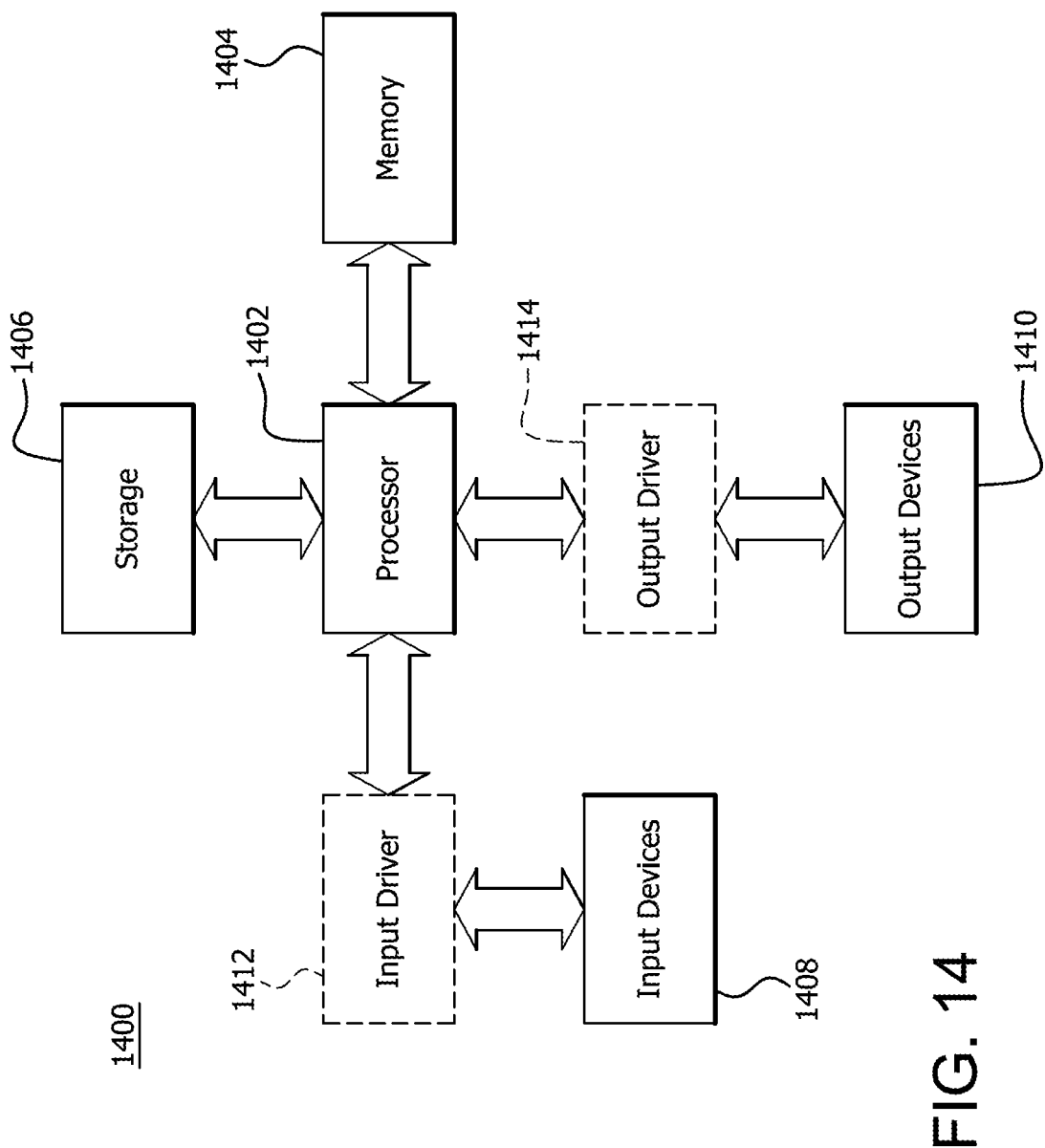
FIG. 14 is a block diagram of an example device in which one or more features of the disclosure can be implemented.

FIG. 14 illustrates a diagram of an example device 1400 in which one or more portions of one or more disclosed examples may be implemented. The device 1400 may include, for example, a head mounted device, a server, a computer, a gaming device, a handheld device, a set-top box, a television, a mobile phone, or a tablet computer. The device 1400 includes a compute node or processor 1402, a memory 1404, a storage 1406, one or more input devices 1408, and one or more output devices 1410. The device 1400 may also optionally include an input driver 1412 and an output driver 1414. It is understood that the device 1400 may include additional components not shown in FIG. 14.

The compute node or processor 1402 may include a central processing unit (CPU), a graphics processing unit (GPU), a CPU and GPU located on the same die, or one or more processor cores, wherein each processor core may be a CPU or a GPU. The memory 1404 may be located on the same die as the compute node or processor 1402, or may be located separately from the compute node or processor 1402. The memory 1404 may include a volatile or non-volatile memory, for example, random access memory (RAM), dynamic RAM, or a cache.

The storage 1406 may include a fixed or removable storage, for example, a hard disk drive, a solid state drive, an optical disk, or a flash drive. The input devices 1408 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 1410 may include a display, a speaker, a printer, a haptic feedback device, one or more lights, an antenna, or a network connection (e.g., a wireless local area network card for transmission and/or reception of wireless IEEE 802 signals).

The input driver 1412 communicates with the compute node or processor 1402 and the input devices 1408, and permits the compute node or processor 1402 to receive input from the input devices 1408. The output driver 1414 communicates with the compute node or processor 1402 and the output devices 1410, and permits the processor 1402 to send output to the output devices 1410. It is noted that the input driver 1412 and the output driver 1414 are optional components, and that the device 1400 will operate in the same manner if the input driver 1412 and the output driver 1414 are not present.

In general and without limiting embodiments described herein, a computer readable non-transitory medium including instructions which when executed in a processing system cause the processing system to execute a method for load and store allocations at address generation time.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for predicting dependent store-load pairs to reduce load latency when storing and loading from a same memory address by bypassing a load store (LS) unit within an execution unit, the method comprising:
   inputting load and store instruction information from a micro operation queue;
   comparing load instruction information to values in a prediction table and outputting the comparison to a predictor logic;
   comparing store instruction information to values in the prediction table;
   determining if the store is valid based on values in the prediction table and outputting a store validity determination and the store comparison to the predictor logic;
   determining a confidence value and providing an indication of the confidence value to the predictor logic; and
   providing memory dependency predictor information from the predictor logic to a memory renaming unit.

2. The method of claim 1, wherein the input load and store instruction information is used to identify the respective load and store instructions.

3. The method of claim 1, wherein the input load and store instruction information comprises a fetch address of the store.

4. The method of claim 1, wherein the input load and store instruction information comprises a fetch address of the load.

5. The method of claim 1, wherein the prediction table has been trained through the LS unit.

6. The method of claim 1, further comprising linking the load to the store in the memory renaming unit.

7. A system for predicting dependent store-load pairs to reduce load latency when storing and loading from a same memory address by bypassing a load store (LS) unit within an execution unit, the system comprising:
   a micro operation queue configured to dispatch load or store operations;
   one or more predictive units configured to identify conditions where a load/store unit is bypassed and memory renaming is utilized for at least one of the load or store operations; and
   a memory renaming unit configured to operate to cause the at least one of the load or store operations to be renamed.

8. The system of claim 7, further comprising a floating point renamer that renames the at least one of the load or store operations.

9. The system of claim 7, further comprising an integer renamer that renames the at least one of the load or store operations.

10. The system of claim 7, wherein the dispatched load or store operation is used to identify the respective load and store.

11. The system of claim 7, wherein a dispatched load or store information comprises a fetch address of the store.

12. The system of claim 7, wherein a dispatched load or store information comprises a fetch address of the load.

13. The system of claim 7, wherein the predictive unit includes at least one prediction table.

14. The system of claim 7, wherein the predictive unit has been trained through the LS unit.

15. The system of claim 7, further comprising linking the load to the store in the memory renaming unit.

16. A method for performing training of a prediction table used for predicting dependency of stores and loads to reduce load latency when storing and loading from a same memory address by bypassing a load store (LS) unit within an execution unit, the method comprising:
   inputting load and store instruction information from the load store unit;
   providing an indication of an acceptance of store to load forwarding to a confidence counter update logic;
   comparing load instruction information to values in the prediction table and outputting the comparison to the confidence counter update logic;
   comparing store instruction information to values in the prediction table and outputting the comparison to the confidence counter update logic;
   determining a confidence value and providing an indication of the confidence value to the confidence counter update logic; and
   updating entry in a confidence field of the prediction table based on feedback from the confidence counter update logic.

17. The method of claim 16, wherein the input load and store instruction information is used to identify the respective load and store instruction.

18. The method of claim 16, wherein the input load and store instruction information comprises a fetch address of the store.

19. The method of claim 16, wherein the input load and store instruction information comprises a fetch address of the load.

20. The method of claim 16, wherein the prediction table has been trained through the LS unit.

21. A method of memory renaming to reduce load latency when storing and loading from a same memory address by bypassing a load store (LS) unit within an execution unit, the method comprising:
   implementing a load store forwarding prediction mechanism in a decode unit of a processor;
   maintaining data stored by the store in the execution unit using a register file based in the implemented prediction mechanism;
   directing a dependent load to utilize the maintained data to bypass the LS unit; and
   providing correction if the prediction mechanism is incorrect in the prediction.

* * * * *